US007945257B2

(12) United States Patent
Abdel-Kader

(10) Patent No.: US 7,945,257 B2
(45) Date of Patent: *May 17, 2011

(54) METHOD AND SYSTEM FOR SELF-TERMINATING A MEDIA SERVICE DUE TO AN OUT-OF COVERAGE CONDITION

(75) Inventor: Sherif Abdel-Kader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,002

(22) Filed: May 17, 2010

(65) Prior Publication Data

US 2010/0220602 A1 Sep. 2, 2010

Related U.S. Application Data

(63) Continuation of application No. 11/559,020, filed on Nov. 13, 2006, now Pat. No. 7,747,247, which is a continuation of application No. 10/991,386, filed on Nov. 19, 2004, now Pat. No. 7,349,690.

(51) Int. Cl.
*H04M 11/00* (2006.01)
*H04M 4/00* (2006.01)
*H04W 4/00* (2009.01)
(52) U.S. Cl. ............... 455/421; 455/426.1; 370/331
(58) Field of Classification Search ............... 455/422.1, 455/452.2, 422, 41.2, 573, 445; 709/223; 370/338, 331
See application file for complete search history.

(56) References Cited

U.S. PATENT DOCUMENTS

| 5,995,830 | A | 11/1999 | Amin et al. |
| 6,055,426 | A | 4/2000 | Beasley et al. |
| 6,633,760 | B1 * | 10/2003 | Ham et al. ............ 455/422.1 |
| 6,745,031 | B2 | 6/2004 | Chun et al. |
| 2002/0034166 | A1 | 3/2002 | Barany et al. |
| 2002/0152299 | A1 * | 10/2002 | Traversat et al. ......... 709/223 |
| 2004/0203424 | A1 | 10/2004 | Akhteruzzaman et al. |
| 2004/0203607 | A1 | 10/2004 | Satapathy |
| 2006/0026288 | A1 | 2/2006 | Acharya et al. |

FOREIGN PATENT DOCUMENTS

WO    WO 03/001762 A2    1/2003

OTHER PUBLICATIONS

M. Garcia-Martin, 3rd-Generation Partnership Project (3GPP) Release 5 requirements on the Session Initiation Proctocol (SIP), Ericsson, Oct. 11, 2002.
Telia Eskil Ahlin, "Ungraceful Session Termination in the IM Domain", 3GPP TSG N1, Tdoc S2-001603, 3GPP TSG SA WG2 Technical Contribution, Sep. 4-8, 2000.
Donovan S., Rosenberg J., Session Timers in the Session Initiations Protocol (SIP), Jul. 18, 2004.

* cited by examiner

*Primary Examiner* — Charles N Appiah
*Assistant Examiner* — Kiet Doan
(74) *Attorney, Agent, or Firm* — Ridout & Maybee LLP

(57) ABSTRACT

A method and mobile device that self-terminates a media service if an out-of-coverage condition is detected. The media service operates on top of a connectionless peer-to-peer packet-based transport protocol. The out-of-coverage condition may relate to the mobile device itself or to a remote mobile device engaged in the media service. The loss of coverage by the remote mobile device may be detected by observing whether the remote mobile device has failed to send any data packets for more than a predetermined period of time. If an out-of-coverage situation is detected, then the method or device initiates service cancellation or release.

20 Claims, 5 Drawing Sheets

METHOD AND SYSTEM FOR SELF-TERMINATING A MEDIA SERVICE DUE TO AN OUT-OF COVERAGE CONDITION

CROSS-REFERENCE TO RELATED APPLICATIONS

The present application is a continuation of U.S. patent application Ser. No. 11/559,020 filed Nov. 13, 2006, which is a continuation of U.S. patent application Ser. No. 10/991,386 filed Nov. 19, 2004, both of which are owned in common herewith.

FIELD OF TECHNOLOGY

The present application relates to methods and devices for gracefully terminating media services in response to out-of-coverage conditions at one of the termination points for the media service and, in particular, to terminating a wireless VoIP call when a mobile device goes out-of-coverage.

BACKGROUND INFORMATION

Many mobile wireless devices now provide users with the capability to obtain media communication services over packet-based wireless networks. For example, many mobile devices are enabled to provide Voice-over-IP (VoIP). Wireless local area networks (WLANs), such as those defined by the IEEE 802.11 standard, are also becoming more common, especially on business or university campuses or other facilities in order to provide effective wireless coverage to a defined area.

A media service like VoIP operates over a packet-based network using a peer-to-peer connectionless protocol, such as real-time transport protocol (RTP), to exchange data packets between two or more termination points, for example, mobile devices. An RTP path is typically established through the wireless network (and, possibly, other connected networks) using a service set-up or control protocol, like session initiation protocol (SIP). Other control or set-up protocols may also be used to establish an RTP path, or other connectionless peer-to-peer transport path, to facilitate packet exchange for a media service.

A media service in which at least one of the termination points is a mobile device operating in a wireless network is prone to disruption as a result of the mobile device losing coverage. Coverage may be lost for a number of reasons, but most commonly because the mobile device roams into a region in which RF communications between the mobile device and a wireless network base station are interrupted, attenuated, interfered with, or otherwise disrupted. When the mobile device goes out-of-coverage, neither it nor the other termination point (which may also be a mobile device) is necessarily aware of the out-of-coverage condition at an application level. As a result, the service that was established between the two termination points continues, despite the fact that the devices cannot exchange data packets. Therefore the devices remain tied up by a stalled service application when they might otherwise establish other services. The devices may remain busy with the failed service until a user deems the service to have failed and manually initiates termination of the service.

It would be advantageous to provide for methods and devices that gracefully terminate services in response to out-of-coverage conditions without necessarily requiring manual user intervention.

BRIEF SUMMARY

The present application describes methods, systems, and devices that detect out-of-coverage conditions with respect to a mobile device engaged in a media service over a connectionless packet-based media path. The methods, systems, and devices provide for graceful termination of the media service in response to the detected out-of-coverage condition.

The present application describes a method and system that employs a proxy server associated with a mobile device in a wireless network, wherein the proxy server monitors whether the mobile device is still in coverage. The media service operates on top of a connectionless peer-to-peer packet-based transport protocol. If the proxy server detects that the device has lost coverage for more than a predetermined length of time, then it sends an out-of-coverage message to the other termination point engaged in the media service. The out-of-coverage message may instruct the termination point to release or cancel the service.

The present application also describes a method and mobile device that self-terminates a media service if an out-of-coverage condition is detected. The media service operates on top of a connectionless peer-to-peer packet-based transport protocol. The out-of-coverage condition may relate to the mobile device itself or to a remote mobile device engaged in the media service. The loss of coverage by the remote mobile device may be detected by observing whether the remote mobile device has failed to send any data packets for more than a predetermined period of time. If an out-of-coverage situation is detected, then the method or device initiates service cancellation or release.

In one aspect, the present application provides a method of terminating a media service in a system having a wireless device, a remote termination point, and a wireless network. The media service operates peer-to-peer over a connectionless packet-based transport protocol. The wireless network includes a proxy server associated with the wireless device. The method includes steps of sending a ping message from the proxy server to the wireless device to determine whether the wireless device remains in coverage, determining that the wireless device is out-of-coverage based upon a lack of a response from the wireless device, and sending a service release message from the proxy server to the remote termination point to alert the remote termination point to the out-of-coverage condition.

In another aspect, the present application provides a proxy server for use in a wireless network in association with a mobile device engaged in a media service with a remote termination point over the wireless network. The media service operates peer-to-peer over a connectionless packet-based transport protocol. The proxy server includes a ping component for sending a ping message to the mobile device to determine whether the mobile device remains in coverage, a timer for determining whether the mobile device is out-of-coverage based upon expiry of a predetermined time period without a response from the mobile device, and an out-of-coverage handler for sending a service release message to the remote termination point in response to said determination of an out-of-coverage condition.

In yet another aspect, the present application provides a method of self-terminating a media service due to an out-of-coverage condition. The media service is established between a mobile device and a remote termination point over a wireless network. The media service includes the transmission of data packets using a peer-to-peer connectionless transport protocol. The mobile device goes out-of-coverage. The method includes the steps of recognizing a loss of signal coverage on the mobile device and starting a timer in response to the loss of signal coverage, stopping the timer if the signal coverage is restored, and terminating the media service on the mobile device if the timer exceeds a predetermined threshold.

In a further aspect, the present application provides a mobile device for engaging in a media service with a remote termination point over a wireless network. The media service includes the transmission of data packets using a peer-to-peer connectionless transport protocol. The mobile device includes a communications subsystem for establishing a connection with the wireless communication system and receiving RF communications, including data packets from the remote termination point. It also includes a processor for controlling the communications subsystem and a call termination module for self-terminating the media service due to an out-of-coverage condition. The call termination module includes a timer for determining an elapsed time since a loss of signal coverage, wherein timer is triggered by the loss of signal coverage and the timer is stopped by a restoration of signal coverage, and a loss of coverage handler responsive to the elapsed time reaching a predetermined threshold, wherein the loss of coverage handler terminates the media service on the mobile device.

In another aspect, the present application provides a method of self-terminating a media service by a first mobile device due to an out-of-coverage condition at a second mobile device. The media service is conducted between the first mobile device and the second mobile device over a wireless network, and the media service includes the transmission of data packets using a peer-to-peer connectionless transport protocol. The method includes the steps of starting a timer on the first mobile device after receipt of a data packet from the second mobile device, restarting the timer if a further data packet is received from the second mobile device, and terminating the media service if the timer exceeds a predetermined threshold.

In a further aspect, the present application provides a first mobile device for engaging in a media service with a second mobile device over a wireless network. The media service operates over a peer-to-peer connectionless transport protocol. The first mobile device includes a communications subsystem for establishing a connection with the wireless communication system and receiving RF communications, including data packets from the second mobile device, and a processor for controlling the communications subsystem. The first mobile device also includes a call termination module for self-terminating the media service due to an out-of-coverage condition at the second mobile device. The call termination module includes a timer for determining an elapsed time since receipt of a most recent data packet from the second mobile device, wherein the timer is started by receipt of the most recent data packet and the timer is restarted by receipt of a subsequent data packet, and a loss of coverage handler responsive to the elapsed time reaching a predetermined threshold, wherein the loss of coverage handler terminates the media service.

In one aspect, the media service includes the transmission of data packets using a peer-to-peer connectionless transport protocol Other aspects and features of the present application will be apparent to one of ordinary skill in the art in light of the following detailed description and drawings depicting one or more embodiments.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Figure 1:
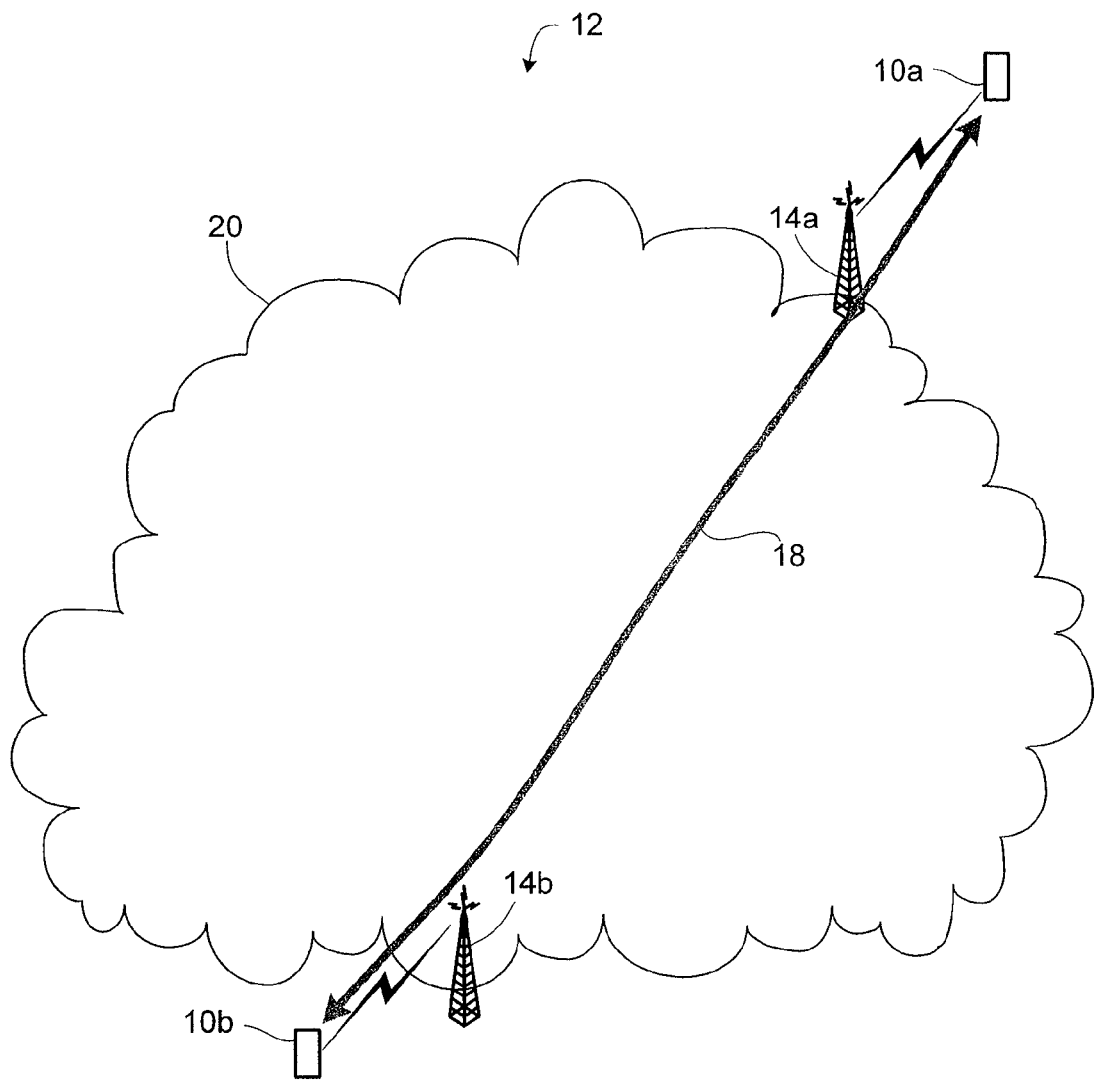
FIG. 1 diagrammatically shows a wireless communications system.

Reference is first made to FIG. 1, which diagrammatically shows a wireless communications system 12. The wireless communications system 12 includes a plurality of access points or base stations 14 (two are shown individually as 14a and 14b) interconnected in a network 20. The wireless communications system 12 may comprise a wireless local area network associated with a campus, building, or other facility. For example, the wireless communication system 12 may comprise a wireless network conforming to IEEE 802.11 standards. In other embodiments, the wireless communications system 12 may comprise any wireless communications network or combination of interconnected networks, including, without limitation, TDMA, CDMA, GSM/GPRS, EDGE, UMTS or CDPD. The wireless communications system 12 may be connected to other networks or communication systems including, for example, the public switched telephone network (PSTN) (not shown), or a wide area network such as the Internet (not shown).

As is known, the base stations 14 perform radio frequency (RF) protocols to support data and voice exchanges with one or more mobile devices 10 (shown individually as 10a and 10b). Each mobile device 10 is configured to exchange RF-based communications with one of the base stations 14 using known protocols. The mobile device 10a may establish a service with another mobile device 10b or other termination point, wherein the service includes sending and/or receiving media packets through the wireless communications system 12 over a media path 18. The media packets relate to real-time media, such as audio, video, or multi-media applications. In one embodiment, the media packets relate to a Voice-over-IP call. In other embodiments the media packets may relate to video sessions, streaming audio or video, real-time gaming applications or other multi-media sessions. Such a media session may be established over IP-based networks using real-time transport protocol (RTP) on top of user datagram protocol (UDP). Session initiation protocol (SIP) or other control protocols may be employed to set-up, manage, control, and or tear down media paths between termination points.

Although FIG. 1 depicts a media session between two mobile devices 10 in the wireless communication system 12, it will be appreciated that the present application is not limited to point-to-point media services and may include multi-cast or broadcast communications. Moreover, the present application is not limited to communications within the wireless communications system 12. The media service may be established between a mobile device 10 within the wireless communication system and termination points located on other networks connected with the wireless communication system 12, including through the Internet or the PSTN. The termination points are not necessarily other mobile devices 10, and may include IP phones, personal computers, gateways, media servers, and any other device capable of terminating a media service.

The media service operating over the media path 18 is prone to disruption if one of the mobile devices 10 goes out-of-coverage. Coverage may be lost for a number of reasons, but most commonly because the mobile device 10 roams into a region in which RF communications between the mobile device 10 and a wireless network base station 14 are interrupted, attenuated, interfered with, or otherwise disrupted. When the mobile device 10 goes out-of-coverage, at an application level neither it nor the other termination point (which may also be a mobile device 10) may be aware of the out-of-coverage condition. As a result, the service that was established between the two termination points may continue, despite the fact that packets cannot be sent or received from the out-of-coverage mobile device 10.

In accordance with an aspect of the present application, the out-of-coverage mobile device, for example mobile device 10a, self-terminates the media service after a predetermined time if coverage has not been restored. The mobile device 10a detects when coverage is first lost and begins a timer. If coverage is restored, then the timer is reset and the media service resumes normal operation. If coverage is not restored before expiry of a predetermined time period, then the out-of-coverage mobile device 10a presumes that it will not regain coverage soon and it terminates the service. For example, in the case of a VoIP call, it releases the call.

In accordance with another aspect of the present application, the in-coverage mobile device 10b may also self-terminate the media service if it recognizes that the other device 10a has lost coverage and has not regained it within a preset time period. The in-coverage mobile device 10b may recognize that the other device 10a has lost coverage by noting that the other device 10a has ceased sending data packets. The in-coverage mobile device 10b may start a timer after receipt of a data packet from the other device 10a. If no further data packets are received from the other device 10a before expiry of the preset time period, then the in-coverage device 10b may assume that the other device 10a has lost coverage and has been unable to regain it. The in-coverage device 10b may then terminate the service. For example, in the case of a VoIP call, the in-coverage device may release the call. It may also send a call release command, like a SIP BYE message to the other device 10a or its proxy server.

Figure 2:
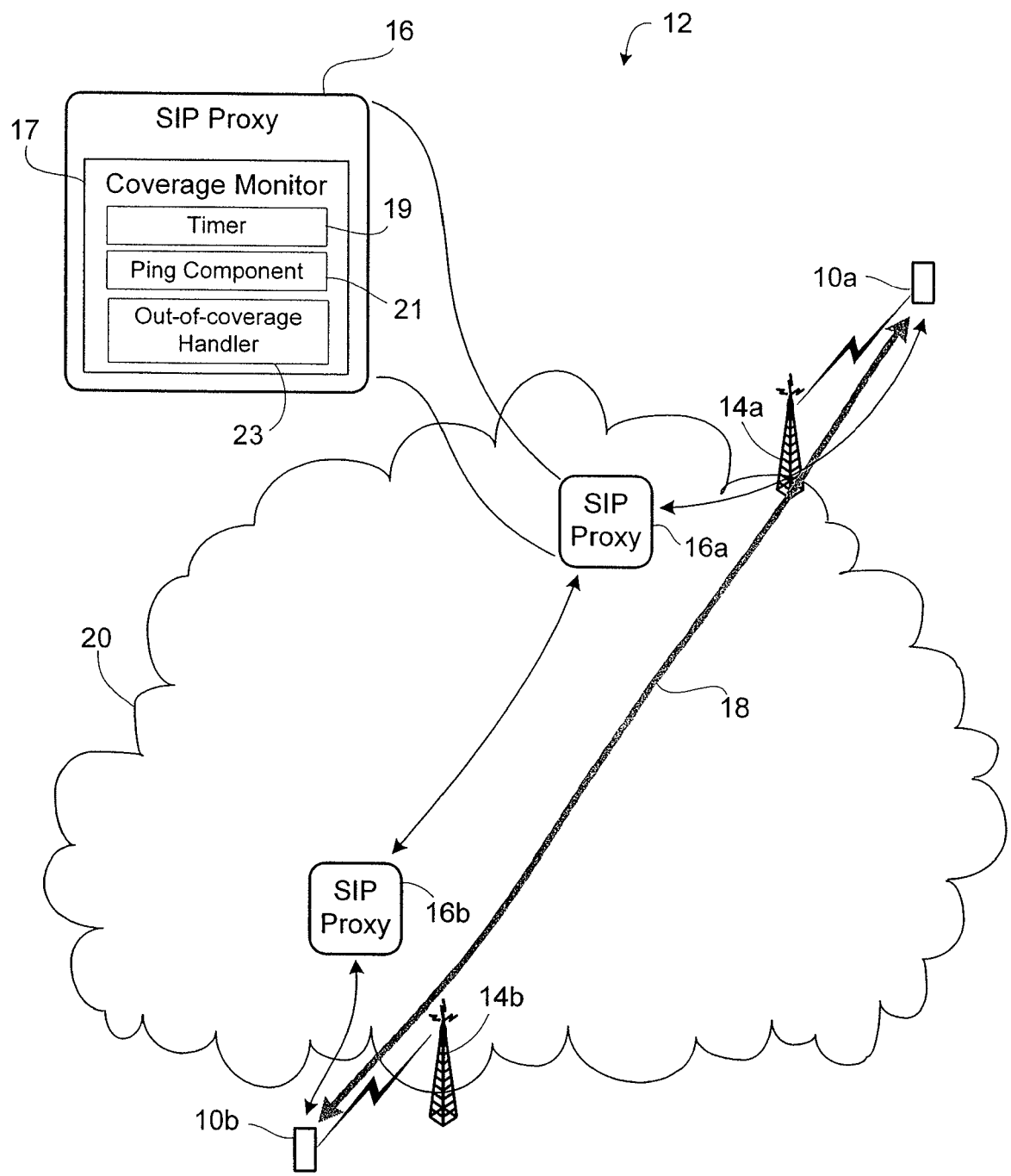
FIG. 2 diagrammatically shows another embodiment of the wireless communication system.

Reference is now made to FIG. 2, which diagrammatically shows another embodiment of the wireless communication system 12. FIG. 2 shows one or more proxy servers 16 (shown individually as 16a and 16b) within the wireless network 20.

In one embodiment, the proxy servers 16 may comprise call control or set-up servers for communicating with an associated mobile device 10 to setup the media path 18 to enable establishment of the media service between the mobile devices 10. In one example embodiment, the proxy servers 16 comprise SIP proxies for performing SIP signalling to set up an RTP path for the media service.

In accordance with one aspect of the present invention, a proxy server 16 monitors its associated mobile device 10 to detect an out-of-coverage condition. If the proxy server 16 determines that its associated mobile device 10 has gone out-of-coverage and has not regained coverage within a set time period, then it informs the other mobile device 10 and/or its associated proxy server 16 about the out-of-coverage condition. The proxy server 16 having the associated out-of-coverage mobile device 10 may send a service termination message upon determining that the device 10 has been out-of-coverage for the set time period. For example, in the embodiment shown in FIG. 2, the SIP proxy 16a may send a SIP BYE message to the other SIP proxy 16b if mobile device 10a goes out-of-coverage for more than the preset time period.

To determine whether its associated mobile device 10 has lost coverage, the SIP proxies may each include a coverage monitor 17. The coverage monitor 17 may include a timer 19, a ping component 21, and an out-of-coverage handler 23. The coverage monitor 17 is configured to detect when the mobile device 10 goes out-of-coverage and determine whether the device 10 is likely to regain coverage in a reasonable period of time. The coverage monitor 17 is also configured to notify the other party or termination point if the mobile device 10 is unlikely to regain coverage.

In particular, the ping component 21 sends a periodic ping or other message to the associated mobile device 10. Upon receipt of the ping, the mobile device 10 responds with a reply message. The ping may be any message to which the mobile device 10 will automatically respond if it is capable of receiving the ping and sending a response, i.e. if it is in coverage. The ping component 21 may ping the mobile device 10 on a periodic basis, such as for example once every second. It will be appreciated that it could be more often or less often depending on the circumstances and any concern with the overhead created by the ping messages.

The timer 19 monitors the time between reply messages. If the mobile device 10 fails to send a reply message for a set period of time, for example ten or more seconds, then the timer 19 expires. Expiry of the timer 19 is indicative of the mobile device 10 being out-of-coverage.

The out-of-coverage handler 23 reacts to expiry of the timer 19 by sending an out-of-coverage message to the other termination point or its proxy server 16. In one embodiment, the out-of-coverage handler 23 sends a service termination message to gracefully terminate the service due to the out-of-coverage condition. In an embodiment wherein the proxy server 16 comprises a SIP proxy, the out-of-coverage handler 23 sends a SIP BYE message to terminate the SIP session.

Those of ordinary skill in the art will appreciate that the mobile device 10 is configured to accept and respond to ping messages from the proxy server 16. Moreover, those of ordinary skill in the art will appreciate that it may be advantageous for the other termination point or its associated proxy server to accept service termination messages or commands from the proxy server 16. In some cases, the other termination point may be configured to reject such messages or commands from an unknown server. Accordingly, it may be advantageous to use a proxy server having an existing relationship with the mobile device 10 and the other termination point and/or its proxy, since they will be configured to accept communications from such a source. For example, the proxy server 16 may comprise the media service control server associated with setting up the media path 18 between the termination points to enable the media service. In one embodiment, the proxy server 16 may comprise a SIP proxy. In another embodiment, the proxy server 16 may comprises an H.323 proxy.

Figure 3:
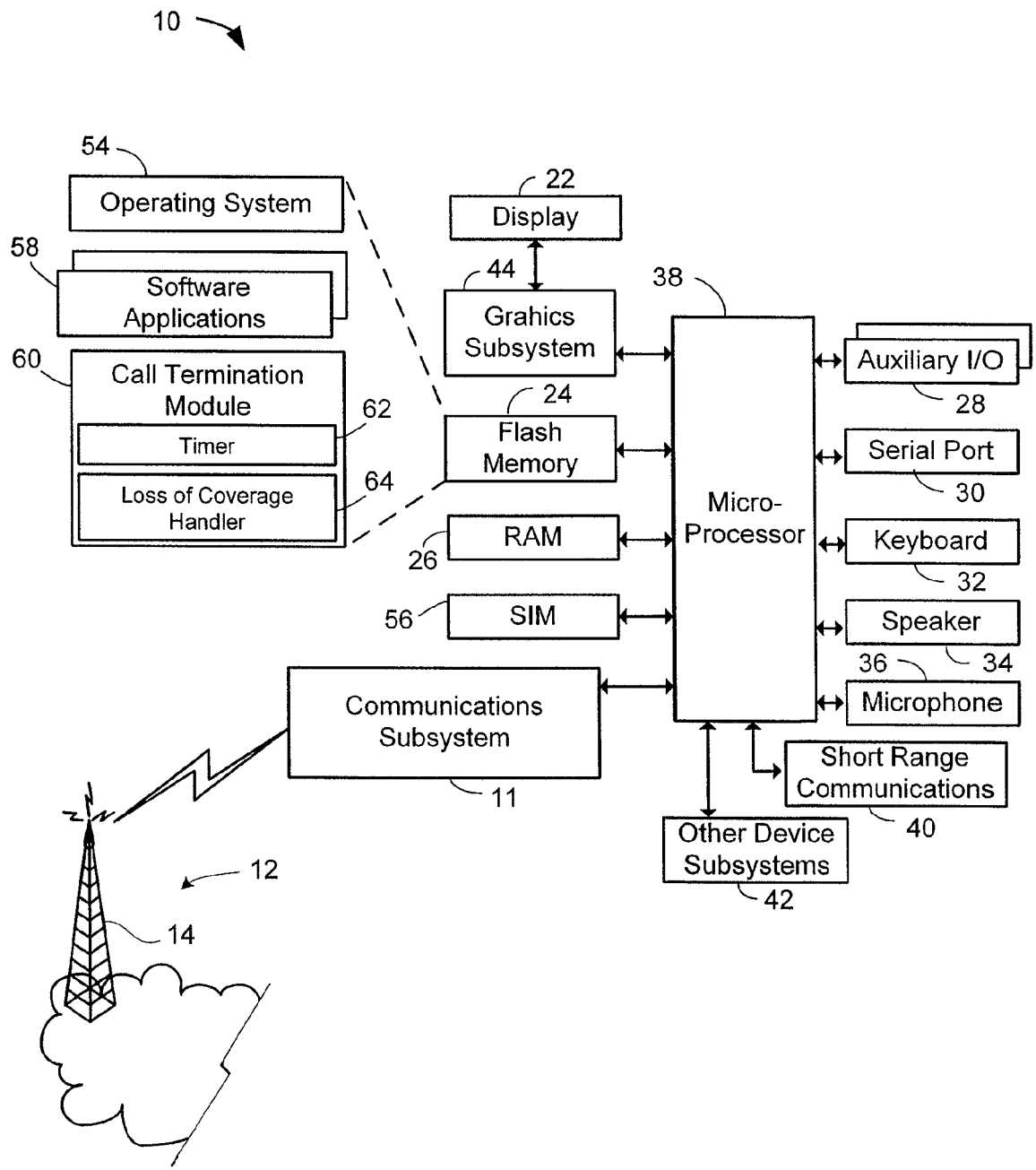
FIG. 3 shows a block diagram of an embodiment of a mobile device.

Reference is now made to FIG. 3, which shows a block diagram of an embodiment of a mobile device 10. The mobile device 10 is a hand-held two-way mobile communication device having at least data and possibly also voice communication capabilities. In an example embodiment, the device 10 has the capability to communicate with other computer systems on the Internet. In various embodiments, the mobile device 10 may include a data communication device, a multiple-mode communication device configured for both data and voice communication, a mobile IP telephone, a mobile communication device, a PDA enabled for wireless communications, a 1-way or 2-way pager, a wireless modem operating in conjunction with a computer system, and any other type of mobile wireless communication device capable of engaging in real-time packet-based communication services such as, for example, VoIP. In the presently described embodiment, the mobile device 10 is configured to operate within the wireless communications system 12. It should be appreciated however that the present application is in no way limited to these example types of devices and may be implemented in other devices.

The device 10 includes a communication subsystem 11. The communications subsystem 11 manages the wireless RF communications with base stations 14 in the wireless communications system 12. The communication subsystem 11 may include one or more antennae, a transceiver, a processing element like a digital signal processor and other components. As will be apparent to those skilled in the field of communications, the particular design of the communication subsystem 11 will be dependent upon the wireless communications system 12 in which the device 10 is intended to operate. The communication subsystem 11 manages the tasks of establishing a connection with a base station 14 and sending and receiving packets over the connection.

The device 10 includes a microprocessor 38 that controls the overall operation of the device 10. The microprocessor 38 interacts with the communications subsystem 11 and also interacts with further device subsystems such as the display 22, flash memory 24, random access memory (RAM) 26, subscriber identity module (SIM) 56, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 3 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Host operating system software 54 and various host software applications 58 used by the microprocessor 38 are, in one example embodiment, stored in a persistent store such as flash memory 24 or similar storage element. Host software applications 58 may include a wide range of applications, including a text messaging application, a ring tone application, a contacts application, and/or a game application. Those skilled in the art will appreciate that the host operating system 54, specific host applications 58, or parts thereof, may be temporarily loaded into a volatile store such as RAM 26. It is contemplated that received communication signals may also be stored to RAM 26.

The microprocessor 38, in addition to its operating system functions, enables execution of host software applications 58 on the device. A predetermined set of host applications 58 which control basic device operations, including at least voice communication applications for example, will normally be installed on the device 10 during manufacture. Further applications may also be loaded onto the device 10 through the WLAN 12, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a communication mode, a received signal such as a voice call, a text message, or web page download will be processed by the communication subsystem 11 and input to the microprocessor 38, which will preferably further process the received signal for output to the speaker 34 or the display 22, or alternatively to an auxiliary I/O device 28. A user of device 10 may also compose data items such as text messages for example, using the keyboard 32 in conjunction with the display 22 and possibly an auxiliary I/O device 28. Such composed items may then be transmitted over a communication network through the communication subsystem 11.

The serial port 30 in FIG. 3 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

The mobile device 10 also includes a call termination module 60. The call termination module 60 provides self-termination capability to react to out-of-coverage conditions. The loss of coverage may relate to the mobile device 10 itself or to a remote termination point engaged in a media service with the mobile device 10.

The call termination module 60 includes a timer 62 and a loss of coverage handler 64.

In one aspect according to the present application, the timer 62 is configured to start when the mobile device 10 loses coverage. The loss of coverage may be detected by the communications subsystem 11, which may issue a message or signal (or event, interrupt, etc.) indicating the loss of coverage. The timer 62 starts in response to detection of the loss of coverage and is reset if coverage is re-established. The re-establishment of coverage may cause the communications subsystem 11 to issue a further message or signal indicating that coverage has been re-obtained. Alternatively, the loss of coverage may be deduced by polling the communications subsystem 11 to determine the signal level. If the device is in coverage, it may expect a signal level in the range −90 dBm to −20 dBm. If the communication subsystem 11 reports a signal level below about −100 dBm or −150 dBm, then the call termination module 60 may deduce that coverage has been lost and it may trigger the timer 62.

If coverage is not re-obtained before expiry of the timer 62, then the loss of coverage handler 64 is triggered. The loss of coverage handler 64 terminates the service locally due to the loss of coverage by the mobile device 10. For example, the loss of coverage handler 64 may issue a service release command to the media service application, such as a VoIP call release command. The loss of coverage handler 64 may issue other directives to close applications or release resources related to the media service, as may be required by the particular application. In one embodiment, the loss of coverage handler 64 may notify the service application so that the service application can update its user interface to indicate that the service has been disconnected.

In another aspect according to the present application, the timer 62 is configured to start whenever a data packet is received from another mobile device in connection with an active media service. The communications subsystem 11 or the media service software application 58 may notify the call termination module 60 of receipt of any data packets related to the media service. Whenever a data packet is received from the other mobile device, the timer 62 resets and begins counting anew. In one embodiment, the communication subsystem 11 sends an interrupt (or event, etc.) to the microprocessor 38 whenever a data packet is received. The various layers of the communications protocol route the packet appropriately. An RTP packet is identifiable in part because of the port to which it is sent since the RTP packets are enclosed in UDP packets.

If the timer 62 reaches a preset time period, such as thirty seconds, without receiving any further data packets from the other mobile device, then the timer 62 expires. Expiry of the timer 62 triggers the loss of coverage handler 64, which terminates the service. The loss of coverage handler 64 terminates the service locally due to the loss of coverage by the other mobile device. For example, the loss of coverage handler 64 may issue a service release command to the media service application, such as a VoIP call release command. The loss of coverage handler 64 may issue other directives to close applications or release resources related to the media service, as may be required by the particular application. The loss of coverage handler 64 may also send a service release command to its proxy server, if any, and/or to the other device and/or its proxy server. For example, the loss of coverage handler 64 may cause the mobile device 10 to transmit a SIP BYE message to terminate the SIP session. It will be appreciated that the preset time period may be established having regard to any silence suppression or other techniques that may be employed by the service and that may give rise to an absence of data packets despite the remote mobile device remaining in coverage.

Although FIG. 3 depicts the call termination module 60 as residing in flash memory 24 for execution by the microprocessor 38, those of ordinary skill in the art will appreciate that the call termination module 60 may be incorporated as a part of the communication subsystem 11 and may be executed by a processor internal to the communication subsystem 11.

Figure 4:
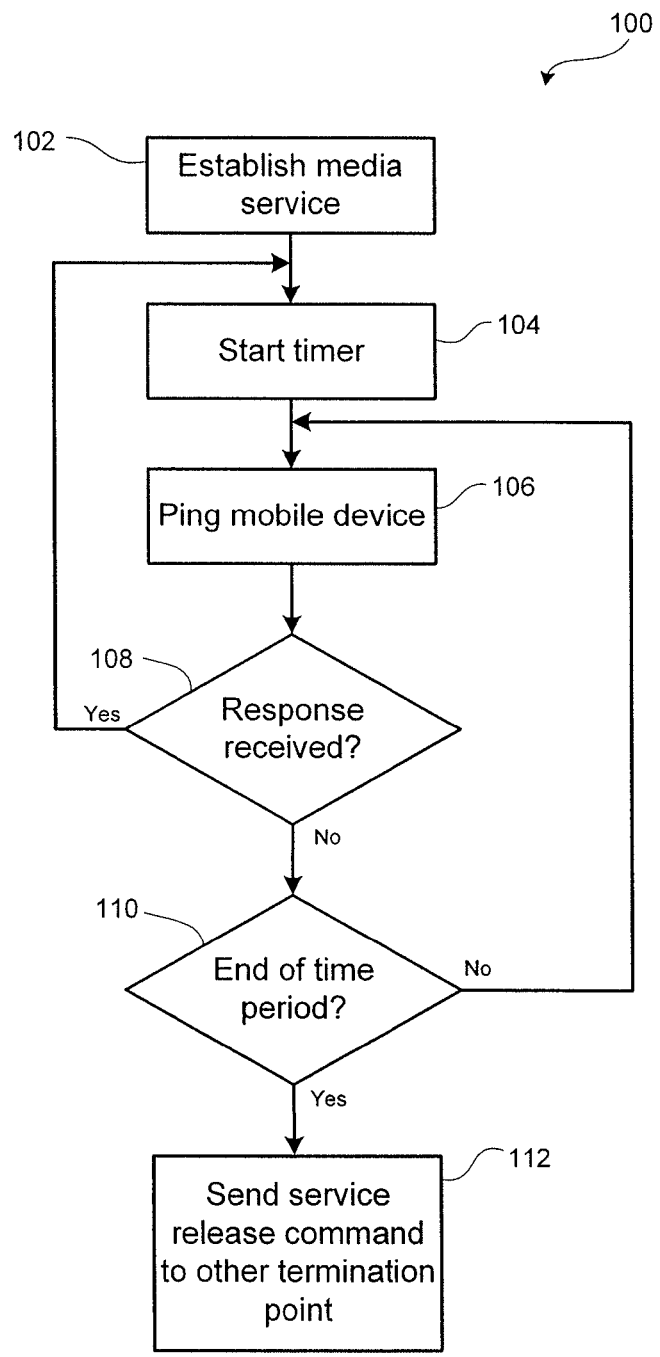
FIG. 4 shows, in flowchart form, a method for handling out-of-coverage conditions using a proxy server.

Reference is now made to FIG. 4, which shows, in flowchart form, a method 100 for handling out-of-coverage conditions using a proxy server. The method 100 begins in step 102 with establishment of a media service between a mobile device and another termination point. The media service may, for example, be a VoIP call. The media service is not necessarily a two-party service and may include multi-point or broadcast communications.

The proxy server may be associated with setting up the media path over which the media data will be sent from the other termination point to the mobile device. For example, the proxy server may be a SIP proxy server and may apply SIP protocols to establish an RTP path.

Once the media service is established, then in step 104 the proxy server initiates a timer and in step 106 it pings the mobile device. In step 108, the proxy server evaluates whether or not it has received a response to the ping. Step 108 may incorporate a certain level of delay to await receipt of a response message. If a response message is received, then the proxy server may conclude that the mobile device is still in-coverage and the method returns to step 104 wherein it repeats. A delay may be incorporated between steps 108 and 104 so as to prevent the proxy server from continually pinging the mobile device. In some embodiments, it may be sufficient to test the mobile device by pinging it about every second. In other embodiments, more frequent or less frequent pinging may be suitable.

If no response is received in step 108 in the normal time frame of, for example, half a second, then in step 110 the proxy server evaluates whether the timer has reached the end of a predetermined time period. The predetermined time period marks the length of time that the proxy server allows for unresponsiveness before it deems the mobile device to be out-of-coverage. In some embodiments, the predetermined time period may be a few seconds, for example between about three and ten seconds. It may be longer or shorter in other embodiments.

If the end of the predetermined time period has not been reached, then the method 100 returns to step 106 to ping the device again. As before, the method 100 awaits a response from the device in step 108. If no response is received after a preset wait period, then the method 100 continues to step 110 again to evaluate whether the timer has reached the end of the predetermined time period.

If the timer has reached the end of the predetermined time period in step 110, then the method 100 proceeds to step 112 wherein the proxy server sends a service release command to the other termination point or its proxy server. The service release command may, in one embodiment, comprise a call release message, such as, for example, a SIP BYE message. In one embodiment, the proxy server also marks the mobile device as "unavailable" instead of "busy" since it is now out-of-coverage.

Figure 5:
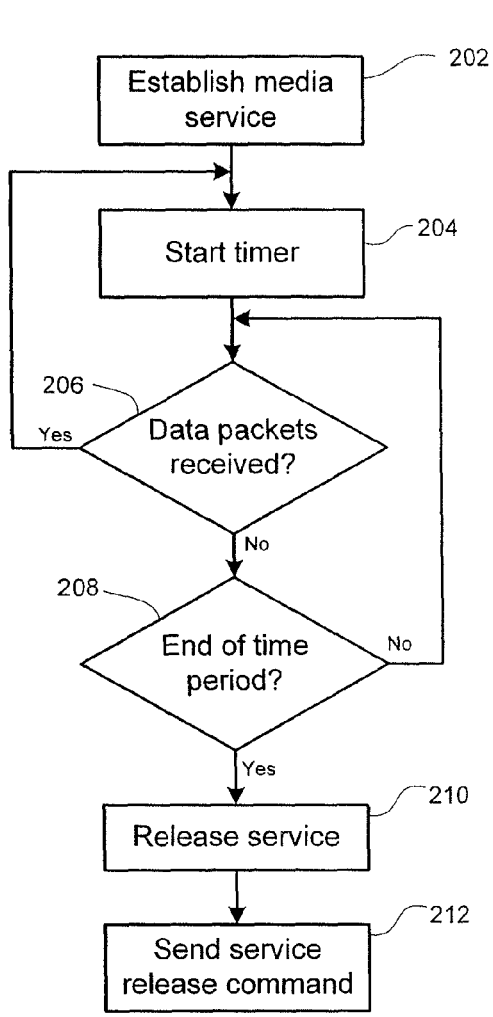
FIG. 5 shows, in flowchart form, a method of detecting that a remote mobile device has lost coverage.

Reference is next made to FIG. 5, which shows, in flowchart form, a method 200 of detecting that a remote mobile device has lost coverage. The method 200 is implemented in a termination point, such as a mobile wireless device, and begins in step 202 with the establishment of a media service between the termination point and the remote mobile device. The media service may comprise any service involving transmission of media packets, such as audio or video data. In one embodiment, the media service comprises a VoIP call. The media service involves the transmission of packetized real-time data using a connectionless transport protocol, such as RTP. Because the media path is connectionless, the termination point may be unaware that the mobile device has lost coverage.

To detect whether the mobile device has lost coverage, the termination point starts a timer in step 204 and watches for receipt of a data packet from the mobile device in step 206. If a data packet is received in step 206, then the method 200 returns to step 202 to reset the timer and begin watching for data packets from the mobile device again. If a data packet is not detected in step 204, then the method 200 evaluates whether the time has reached the end of a predetermined time period in step 208. The predetermined time period corresponds to the length of time after which the termination point will deem the mobile device to have lost coverage if no data packets are received from it. In one embodiment, the predetermined time period may be about thirty seconds; however, it may be shorter or longer depending on the application and implementation.

If the end of the predetermined time period has not been reached in step 208, then the method 200 returns to step 206 to evaluate whether a data packet has been received. It continues to watch for a data packet from the mobile device and evaluate whether the predetermined time period has expired until either event occurs. If the end of the predetermined time period is reached, then the method 200 continues in step 210, wherein the mobile device is deemed to be out-of-coverage and the termination point releases the service. This may include instructing the service application to release any resources, such as media paths, that are assigned to the service. In the case of a VoIP call, it may include issuing a call release command. In step 212, the termination point may also send a service release command to the remote mobile device or to proxy servers within the wireless network. For example, it may send a SIP BYE message.

Figure 6:
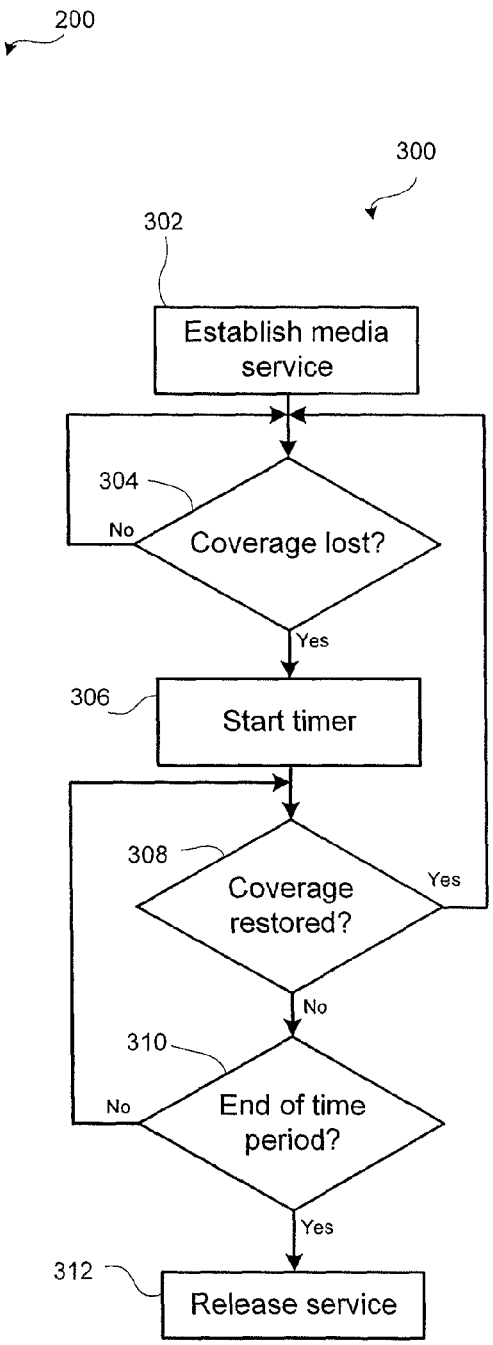
FIG. 6 shows a flowchart depicting a method of terminating a service in response to an out-of-coverage condition in a wireless device.

Now reference is made to FIG. 6, which shows a flowchart depicting a method 300 of terminating a service in response to an out-of-coverage condition in a wireless device. As with the method 200 from FIG. 5, the method 300 begins in step 302 with the establishment of a media service. The media service involves the transmission of real-time data, such as audio or video, over packet-based networks using a suitable peer-to-peer transport protocol, such as RTP.

In step 304 the mobile device detects that it has lost coverage with the wireless network. It may recognize that it has lost coverage due to a signal from the radio chipset, i.e. communication subsystem, in the mobile device. If coverage is lost, then in step 306 the mobile device begins a timer. Then in step 308, the mobile device determines whether it has regained coverage, i.e. whether it has been able to resume RF communications with a base station in the wireless network. If so, then the method 300 returns to step 304 to await detection of a further out-of-coverage condition.

If coverage has not been restored, then the method 300 proceeds to step 310 to evaluate whether the timer has reached the end of a predetermined time period. The predetermined time period marks the length of time after which the mobile device may deem that it has lost coverage and will not be able to easily restore coverage. In one embodiment, the predetermined time period is a few seconds, for example about five seconds. If this predetermined time period is reached, then the method 300 continues to step 312, wherein the mobile device locally terminates the active service. This may include notifying any active service applications and releasing any associated device resources. If the predetermined time period has not been reached, then the method 300 returns to step 308 to evaluate whether coverage has been restored.

Those of ordinary skill in the art will appreciate that the foregoing methods described in conjunction with FIGS. 4, 5, and 6 are example embodiments only. Certain steps may be added, modified, or eliminated without materially affecting the overall functioning of the method in handling an out-of-coverage event. It will be understood that certain steps may be performed concurrently or in an alternative order.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of self-terminating a media service due to an out-of-coverage condition, the media service being established between a mobile device and a remote termination point over a wireless network, the mobile device going out-of-coverage, the method performed by the mobile device comprising:

detecting a loss of signal coverage on the mobile device and starting a timer in response to said loss of signal coverage;
stopping said timer if said signal coverage is restored; and
terminating the media service on the mobile device if said timer exceeds a predetermined threshold, wherein terminating includes releasing resources on the mobile device and closing a media service application associated with the media service,
wherein the media service includes the transmission of data packets using a peer-to-peer connectionless transport protocol.

2. The method claimed in claim 1, wherein the mobile device includes a communication subsystem for engaging in RF communications with the wireless network, and wherein detecting includes receiving a lost coverage signal from said communication subsystem if said communication subsystem loses connectivity with the wireless network, said lost coverage signal indicating said loss of signal coverage.

3. The method claimed in claim 2, wherein stopping said timer includes detecting a restored coverage signal from said communication subsystem if said communication subsystem restores connectivity with the wireless network.

4. The method claimed in claim 1, wherein the media service comprises a VoIP call and wherein terminating includes releasing said VoIP call.

5. The method claimed in claim 1, wherein said peer-to-peer connectionless transport protocol comprises real-time transport protocol (RTP).

6. A mobile device for engaging in a media service with a remote termination point over a wireless network, the mobile device comprising:

a communications subsystem for establishing a connection with the wireless network and receiving RF communications, including data packets from the remote termination point;
a processor for controlling said communications subsystem; and
a call termination module for self-terminating the media service due to an out-of-coverage condition, said call termination module including,
a timer for determining an elapsed time since a loss of signal coverage, said timer being triggered by said loss of signal coverage and said timer being stopped by a restoration of signal coverage; and
a loss of coverage handler responsive to said elapsed time reaching a predetermined threshold, wherein said loss of coverage handler terminates the media service on the mobile device, and
wherein said loss of coverage handler includes a component for releasing resources on the mobile device and closing a media service application associated with the media service,
wherein the media service includes the transmission of data packets using a peer-to-peer connectionless transport protocol.

7. The mobile device claimed in claim 6, wherein said communication subsystem includes a coverage component for generating a lost coverage signal in response to said loss of signal coverage, and wherein said timer receives and is triggered by said lost coverage signal.

8. The mobile device claimed in claim 7, wherein said coverage component further generates a restored coverage signal in response to said restoration of signal coverage, and wherein said timer receives and is stopped by said restored coverage signal.

9. The mobile device claimed in claim 6, wherein the media service comprises a VoIP call and wherein said loss of coverage handler includes a component for releasing said VoIP call in response to said elapsed time reaching said predetermined threshold.

10. The mobile device claimed in claim 6, wherein said peer-to-peer connectionless transport protocol comprises real-time transport protocol (RTP).

11. A method of self-terminating a media service by a first mobile device due to an out-of-coverage condition at a second mobile device, the media service being conducted between the first mobile device and the second mobile device over a wireless network, the method performed by the first mobile device comprising:
   starting a timer on the first mobile device after receipt of a media data packet from the second mobile device, wherein said media data packet includes media data associated with the media service;
   restarting said timer if a further media data packet is received from the second mobile device; and
   terminating the media service if said timer exceeds a predetermined threshold without receiving the further media data packet, wherein terminating includes releasing resources on the mobile device and closing a media service application associated with the media service,
   wherein the media service includes the transmission of media data packets using a peer-to-peer connectionless transport protocol.

12. The method claimed in claim 11, wherein terminating further includes a step of sending a service release message to the second mobile device or an associated proxy server.

13. The method claimed in claim 12, wherein said service release message includes a SIP BYE message.

14. The method claimed in claim 11, wherein the media service comprises a VoIP call.

15. The method claimed in claim 11, wherein the peer-to-peer connectionless transport protocol comprises real-time transport protocol (RTP).

16. A first mobile device for engaging in a media service with a second mobile device over a wireless network, the first mobile device comprising:
   a communications subsystem for establishing a connection with the wireless network and receiving RF communications, including media data packets from the second mobile device, wherein said media data packets include media data associated with the media service;
   a processor for controlling said communications subsystem; and
   a call termination module for self-terminating the media service due to an out-of-coverage condition at the second mobile device, said call termination module including,
      a timer for determining an elapsed time since receipt of a most recent media data packet from the second mobile device, said timer being started by receipt of said most recent media data packet and said timer being restarted by receipt of a subsequent media data packet; and
      a loss of coverage handler responsive to said elapsed time reaching a predetermined threshold, wherein said loss of coverage handler terminates the media service, and
      wherein said loss of coverage handler includes a component for releasing resources on the mobile device and closing a media service application associated with the media service,
   wherein the media service includes the transmission of data packets using a peer-to-peer connectionless transport protocol.

17. The first mobile device claimed in claim 16, wherein said loss of coverage handler further includes a component for sending a service release message to the second mobile device or an associated proxy server.

18. The first mobile device claimed in claim 17, wherein said service release message includes a SIP BYE message.

19. The first mobile device claimed in claim 16, wherein the media service comprises a VoIP call.

20. The first mobile device claimed in claim 16, wherein the peer-to-peer connectionless transport protocol comprises real-time transport protocol (RTP).

* * * * *